June 10, 1969  G. W. SCHNEIDER, JR  3,448,615
ROTARY METER, DIRECT DRIVE
Filed Jan. 3, 1967  Sheet 2 of 5

GEORGE W. SCHNEIDER, JR.
INVENTOR.

BY *Lyon & Lyon*
ATTORNEYS

June 10, 1969  G. W. SCHNEIDER, JR  3,448,615
ROTARY METER, DIRECT DRIVE
Filed Jan. 3, 1967  Sheet 4 of 5

GEORGE W. SCHNEIDER, JR.
INVENTOR.
BY
ATTORNEYS

GEORGE W. SCHNEIDER, JR.
INVENTOR.

BY
ATTORNEYS

United States Patent Office 3,448,615
Patented June 10, 1969

3,448,615
ROTARY METER, DIRECT DRIVE
George W. Schneider, Jr., Huntingdon Valley, Pa., assignors, by mesne assignments, to American Meter Company, Philadelphia, Pa., a corporation of Delaware
Filed Jan. 3, 1967, Ser. No. 606,643
Int. Cl. G01f 3/08
U.S. Cl. 73—261                                                                    8 Claims

ABSTRACT OF THE DISCLOSURE

A meter for measuring the flow rate of fluids having a rotor with axially extending blades turns within a casing and has a rotary gate turning in the same direction for sealing the rotor blades as they pass from the outlet to the inlet of the casing. Meshing parts on rotor and rotary gate are short-length to minimize friction, and eliminate any requirement for separate gears.

Background of the invention

This invention relates to rotary meters for measuring the flow rate of fluids. A device of this type may be classified as a rate of flow meter, vane type. The Gollings Patent No. 1,284,650 shows a device of this general type, but it lacks the crescent-shaped member between the rotor blades and the rotary gate, and it lacks any anti-friction mechanism for the contacts between the rotor blades and the rotary gate.

Summary

A rotor has axial blades which move by fluid pressure through an arcuate channel. An offset cavity intersects the channel between the inlet and outlet of the meter casing, and a gate is mounted to turn within the offset cavity. The gate has axially extending circumferentially spaced openings in its outer periphery leading to internal pockets, and the pockets receive the rotor blades as they pass sequentially through the cavity. Cam surfaces adjacent the rotor blades are engaged by anti-friction rollers carried on the gate for turning the gate in timed relation with the rotor.

Description of the preferred embodiments

Figure 1:
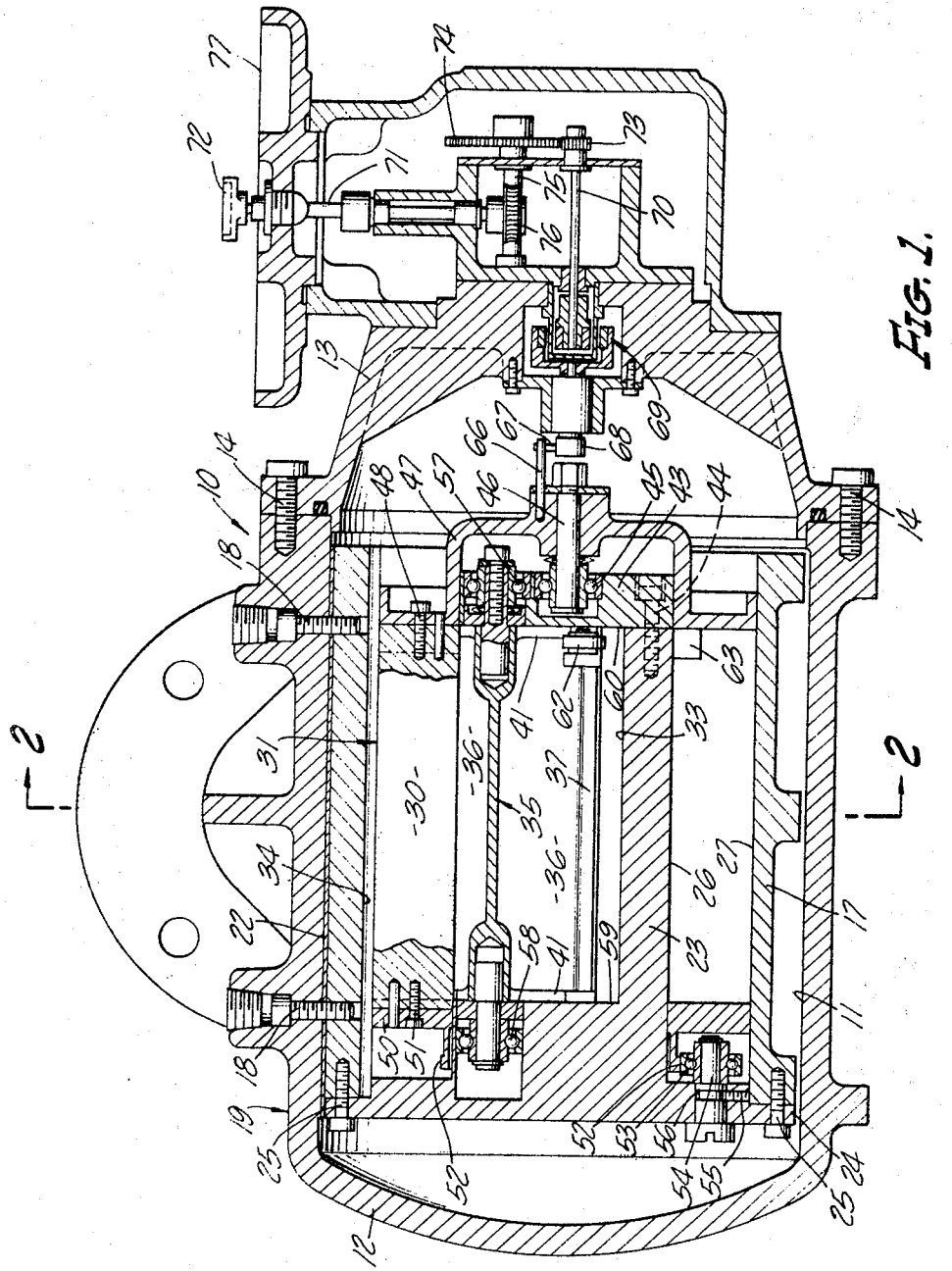
FIGURE 1 is a sectional elevation showing a preferred embodiment of this invention.
Figure 2:
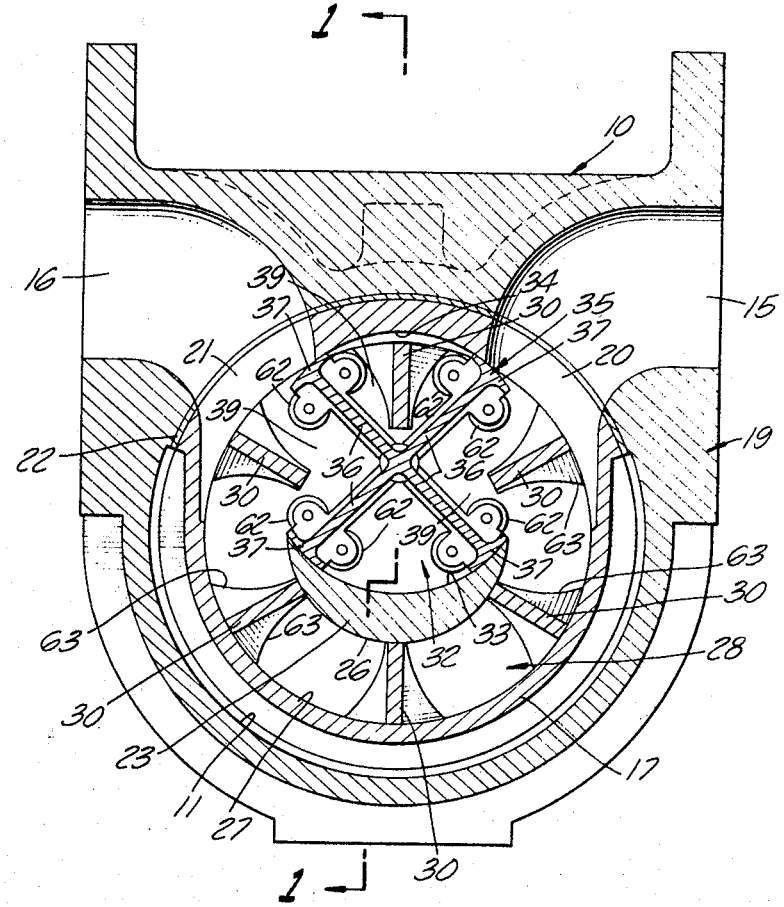
FIGURE 2 is a transverse sectional view taken substantially on the lines 2—2 as shown in FIGURE 1.

Referring to FIGURES 1 and 2 of the drawings, the stationary housing generally designated 10 has a central opening 11. This opening 11 is closed at one end by the integral end member 12, and is closed at the other end by the bonnet 13 attached to the housing 10 by fastenings 14. The housing has an inlet passage 15 and an outlet passage 16. A stationary liner 17 is positioned within the bore 11 and is fixed to the housing 10 by means of the fasteners 18. The housing 10 and liner 17 are part of the stationary body 19. The liner 17 has an opening 20 aligned with the inlet passage 15 and an opening 21 aligned with the outlet passage 16. A gasket 22 is clamped between the housing 11 and the liner 17, in the region of the openings 20 and 21.

A stationary crescent-shaped member 23 is provided with a flange 24 fixed to the liner 17 by fastenings 25. This member 23 has an outer wall surface 26 which is concentric with the inner wall surface 27 in the liner 17, and these walls define an arcuate channel 28 between them. This arcuate channel 28 receives the blades 30 of a rotor generally designated 31 and mounted to rotate within the liner 17. An offset cavity 32 within the liner 17 is defined by the concave cylindrical surfaces 33 and 34, and this cavity 32 intersects the arcuate channel 28. A rotary gate 35 is mounted to turn in the offset cavity 32 and has a plurality of radiating arms 36 each having an integral shoe 37. The outer surface 38 of each shoe 37 is curved and has running clearance within the surfaces 33 and 34. The peripheral space between adjacent arms 36 and shoes 37 forms a peripheral pocket 39 for reception of the rotor blades 30.

For reasons of manufacture and assembly, the member 23 includes a stationary plate 43 fixed thereto by fastenings 44. A bearing assembly 45 is mounted on this plate 43 and supports the trunnion 46 fixed on the end flange 47 of the rotor 31. The rotor blades 30 are secured to this end flange 47 by means of threaded fastenings 48. A ring 50 is secured to the other ends of the rotor blades 30 by means of fastenings 51, and this ring 50 is provided with a circular trackway 52. This trackway 52 is contacted by a plurality of rollers 53 each mounted on a support pin 54 carried on the member 23. A set screw 55 engages a groove 56 in each support pin 54 to prevent axial movement of the support pin. From this description it will be understood that one end of the rotor 31 is supported by means of the trunnion 46 and bearing 45, and the other end is supported by means of the rollers 53 and trackway 52.

The rotary gate 35 is supported on axially spaced bearings 57 and 58. The bearing 57 is carried on the plate 43 and the bearing 58 is carried on the crescent-shaped member 23. The parallel end walls 41 on the rotary gate 35 have running clearance with the stationary wall 59 and surface 60 of the plate 43, respectively. In accordance with this invention, means are provided for driving the rotary gate in timed relation with the turning movement of the rotor blades 30, and as shown in the drawings, this means includes rollers 62 mounted on opposite sides of each arm 36 adjacent the shoe 37 and arranged to have rolling contact with cam surfaces 63 provided on the rotor end flange 47. These cam surfaces 63 and rollers 62 are relatively short in axial length as compared to the axial length of the rotor blades 30 and the axial length of the pockets 39 in the rotary gate. The rolling contact between the rollers 62 and cam surfaces 63 occurs only in the region of the arcuate surface 34 formed in the liner 17. A smooth positive drive of the gate 35 from the rotor 31 is thus assured.

Mechanism for driving a counter or other readout device is conveniently mounted in the bonnet 13. Thus, an axially projecting offset pin 66 on the rotor flange 47 engages a radially projecting arm 67 fixed to the shaft 68. A magnetic coupling device 69 connects the shaft 68 to the shaft 70. The shaft 70 drives the shaft 71 and coupling 72 through speed-reducing gearing 73, 74 and 75, 76. A suitable counter (not shown) may be driven by the coupling 72.

The bearing assemblies 45, 57 and 58, as well as the bearing assemblies within rollers 53 are self-contained and are prepacked with lubricant. The same is true of the trackway 52 and its supporting rollers 53. The only openings through which fluid can flow into these latter areas are the long labyrinth seals formed by the running clearances between the rotating and stationary parts. Dirt particles in the fluid stream are excluded from the bearings and the trackway.

Upon removal of the bonnet 13, after disassembly of the fastenings 14, the internal parts of the meter including liner 17, rotor 31 and pocketed gate 35 may be removed from the housing 10. The fastenings 18 are first removed and this permits the liner 17 with all of its internal parts to be withdrawn axially from the bore 11 in the housing 10. The piping connections to the inlet 15 and outlet 16 need not be disturbed. A new subassembly of liner 17, rotor 31, pocketed gate 35, etc. may be placed in position and the line returned to service with a minimum of "down" time. Furthermore, the housing 10 is constructed to carry loads due to piping and thermal expansion stresses, and therefore the liner 17 and internal parts are free of stresses which can cause distortion and possible piping of rotating elements.

In operation, the housing flanges at the inlet 15 and outlet 16 are connected to suitable piping, not shown. The central opening 11 preferably extends in a horizontal direction, although this is not essential. The assembly of the liner 17, rotor 31, pocketed gate 35 and associated parts is then installed axially into the central opening 11, in the absence of the bonnet 13. The liner is then clamped in position within the housing 10 by means of the fastenings 18. The bonnet 13 is then placed in position and secured by means of the fastenings 14. The parts are then in the position shown in FIGURES 1 and 2 of the drawings. A suitable counter mechanism, not shown, is mounted on the bonnet flange 77 and arranged to be driven by the coupling 72.

Fluid under pressure is then admitted through the inlet passage 15 and opening 20 and into the annular channel 28. Fluid pressure acting on the upstream side of one of the rotor vanes 30 (shown near the 4 o'clock position in FIGURE 2) causes the rotor 31 to turn within the liner 17 in a clockwise direction. The rollers 62 and cam surfaces 63 turn the pocketed gate 35 in a clockwise direction. The pocketed gate 35 prevents direct flow from the inlet 15 to the outlet 16 and requires the fluid to flow through the annular channel 28. Each of the rotor blades 30 is received in one of the gate pockets 39 as it passes from a position near the outlet 16 to a position near the inlet 15. Rotation of the rotor 31 is transmitted through the pin 66, arm 67, shaft 68, magnetic coupling 69 and through the speed-reduction gearing to the drive coupling 72.

Figure 3:
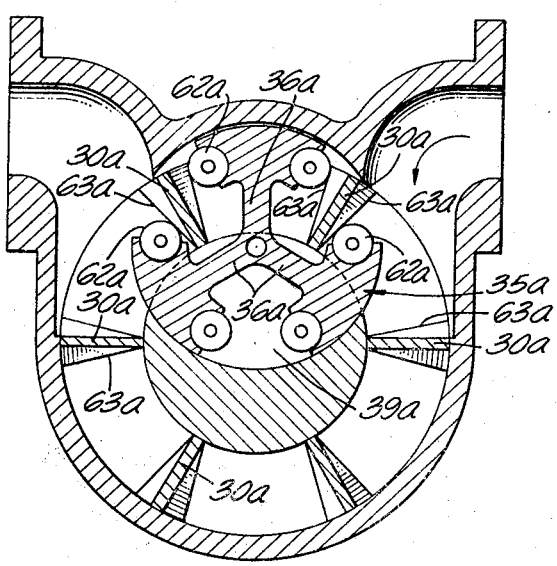
FIGURE 3 is a transverse sectional view similar to FIGURE 2, showing a modification.

In the modification shown in FIGURE 3, the pocketed gate 35a has only three arms 36a and three pockets 39a. Six rotor blades 30a are provided, as before. The geometry of this design is such that the cam surfaces 63a on opposite sides of each rotor blade may be formed as straight shoulders and these may be preferable, from a manufacturing standpoint, to the curved cam surfaces 63 shown in FIGURE 2. The rollers 62a which roll along these shoulders may be the same as previously described. In other respects the device of FIGURE 3 is similar in construction and operation to that previously described.

Figure 4:
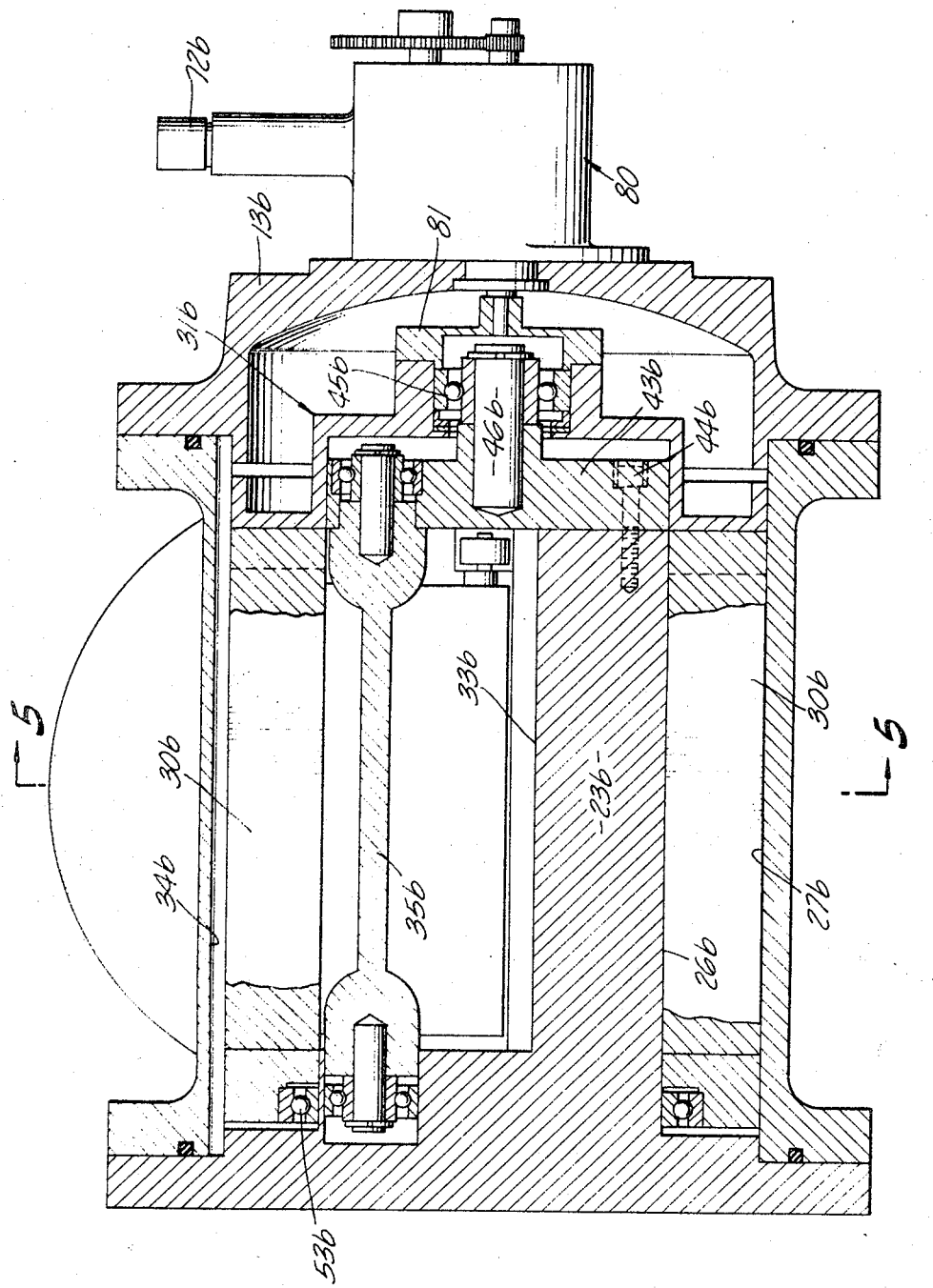
FIGURE 4 is a longitudinal sectional view of another modified form of the invention.
Figure 5:
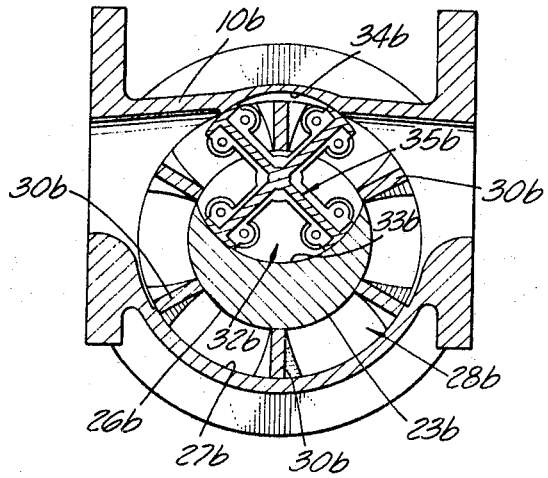
FIGURE 5 is a transverse sectional view taken substantially on the lines 5—5 as shown in FIGURE 4.

In the modification shown in FIGURES 4 and 5, no liner is employed, and instead the rotor blades 30b travel in the arcuate channel 28b formed between the internal surface 27b on the housing 10b and the outer surface 26b formed on the stationary crescent-shaped member 23b. The pocketed gate 35b rotates in the offset cavity 32b defined by the surfaces 33b and 34b. The bearing 45b is supported by the stationary trunnion 46b fixed on the plate 43b, thereby providing a rotary support for one end of the rotor 31b. The other end of the rotor is supported by bearing assembly 53b mounted on the stationary member 23b. A speed-reducing device 80 mounted on the bonnet 13b is driven by the cap 81 on the rotor 31b and serves to drive the coupling 72b for connection to a suitable counter mechanism (not shown). In other respects, the device of FIGURES 4 and 5 is similar in construction and mode of operation to the form of the invention shown in FIGURES 1 and 2.

Figure 7:
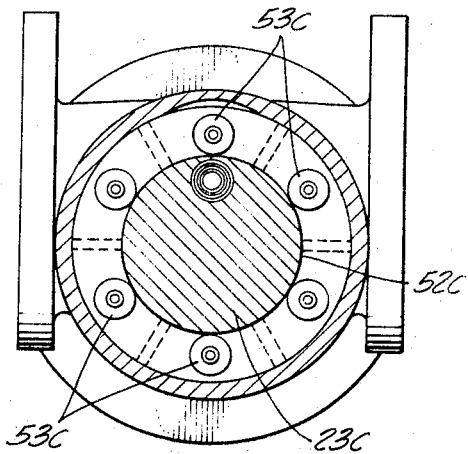
FIGURE 7 is a transverse sectional view taken substantially on the lines 7—7 as shown in FIGURE 6.
Figure 6:
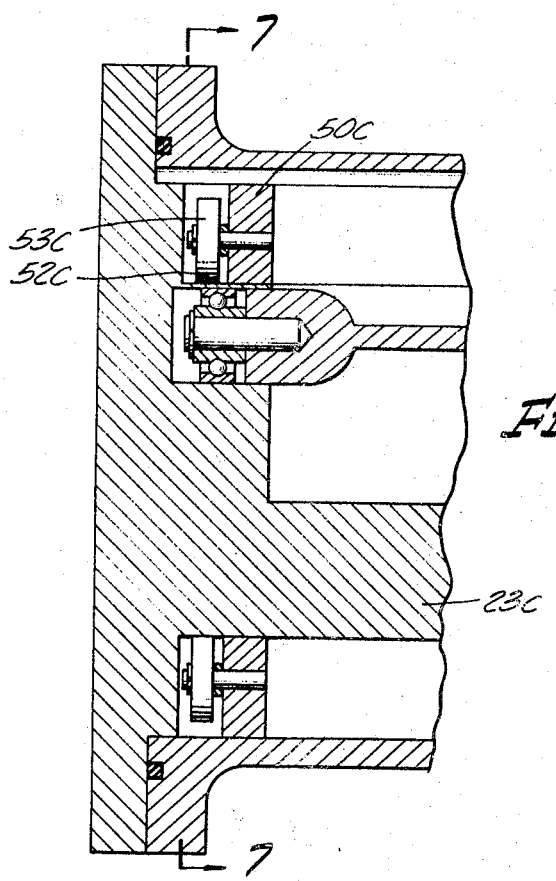
FIGURE 6 is a longitudinal sectional view partly broken away, showing another modification.

The modified form of the device shown in FIGURES 6 and 7 is similar to that shown in FIGURES 4 and 5, except that the large anti-friction bearing 53b is replaced by the rollers 53c mounted on the rotor ring 50c and traveling on the trackway 52c provided on the stationary member 23c. In other respects, the construction and operation of the device of FIGURES 6 and 7 is similar to that shown in FIGURES 4 and 5.

Figure 8:
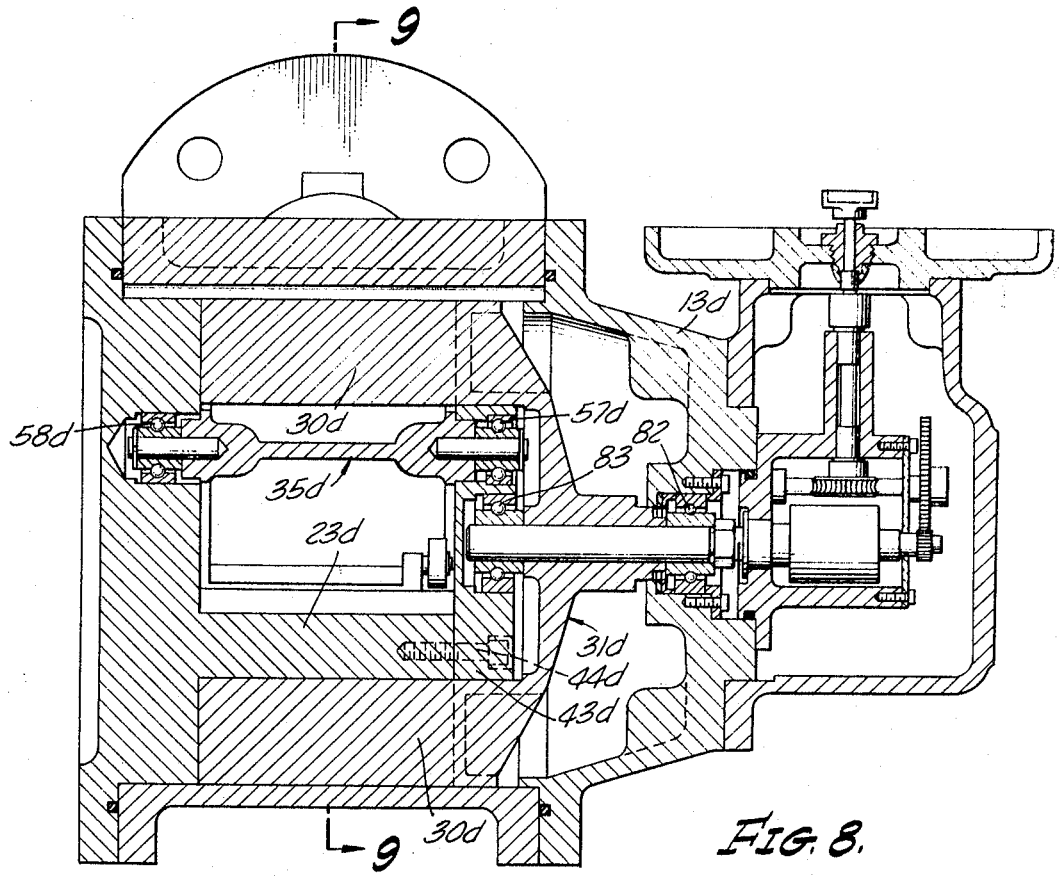
FIGURE 8 is a longitudinal sectional view showing another modification of the invention.
Figure 9:
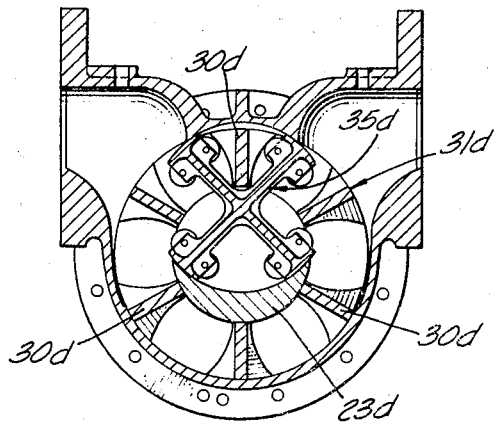
FIGURE 9 is a transverse sectional view taken substantially on the lines 9—9 as shown in FIGURE 8.

The modified device shown in FIGURES 8 and 9 employs a rotor 31d which is mounted on axially spaced bearings 82 and 83, but the rotor blades 30d are supported only at one end; there is no end ring corresponding to the end ring 50 as shown in FIGURE 1. The bearing 82 is carried on the bonnet 13d and the bearing 83 is mounted on the plate 43d fixed to the stationary member 23d by fastenings 44d. The gate 35d turns within the rotor 30d as described above, and is mounted on axially spaced bearings 57d and 58d. No liner is employed. In other respects, the construction and operation of the device shown in FIGURES 8 and 9 is similar to that shown in FIGURES 1 and 2.

Having fully described my invention, it is to be understood that I am not to be limited to the details herein set forth, but that my invention is of the full scope of the appended claims.

I claim:

1. In a fluid meter the combination of: a body, a rotor having axially extending blades mounted to turn within the body, a stationary member fixed relative to the body and projecting into the interior of the rotor, axially spaced bearing means for supporting the rotor including at least one bearing on said stationary member, a pocketed gate mounted substantially within the rotor, the gate having peripheral arcuate portions supported by arms to form a plurality of peripheral pockets between said arcuate portions for reception of the rotor blades, axially spaced bearings on the stationary member for supporting said gate, and means for turning the gate in timed relation with the rotor and in the same direction, said means including a cam surface on at least one side of each rotor blade and at one end of the blade, and a roller mounted on at least one side of each arm for rolling contact with the cam surfaces, the axial length of each roller and each cam surface being relatively short as compared to the axial length of the rotor blades.

2. The combination set forth in claim 1 in which cam surfaces are provided on both sides of each rotor blade for engagement by rollers provided on each side of each gate arm.

3. The combination set forth in claim 1 in which the cam surface on each roller blade comprises a straight shoulder.

4. The combination set forth in claim 1 in which the body comprises a liner removably mounted within a central opening in a housing.

5. The combination set forth in claim 1 in which said bearing means includes an anti-friction bearing assembly within the rotor and remote from the projecting end of said stationary member.

6. The combination set forth in claim 1 in which said bearing means includes a plurality of rollers on said stationary member engaging a trackway on said rotor.

7. The combination set forth in claim 1 in which both of the axially spaced bearings for the rotor are positioned at one end of the rotor blades, and only one of the bearings is carried by the stationary member.

8. In a fluid meter, the combination of: a body having an inlet passage and an outlet passage, a stationary member within the body defining therewith an arcuate channel communicating at opposite ends with said passages, respectively, said body and said member also defining an offset cavity intersecting the channel between said inlet and outlet passages, a rotor mounted to turn on said member and having an end flange, blades fixed on the rotor end flange and adapted to move by fluid pressure through said arcuate channel and through a portion of said cavity, a pocketed gate mounted to rotate within said offset cavity, axially spaced bearings for supporting opposite ends of said gate on said member, said gate having a periphery provided with pockets therein for reception of the rotor blades, each rotor blade having a radially extending cam surface on at least one side thereof at one end of the blade, and a roller on at least one side of each pocket positioned for rolling contact with the cam surfaces, for turning the gate in timed relation with said rotor, and in the same direction, the axial length of each roller and each cam surface being relatively short as compared to the axial length of the rotor blades.

References Cited

UNITED STATES PATENTS

| | | | |
|---|---|---|---|
| 953,206 | 3/1910 | King | 123—13 |
| 1,320,892 | 11/1919 | Munn | 91—133 |
| 1,442,828 | 1/1923 | Rotermund | 91—68 |
| 2,117,922 | 5/1938 | Terrell | 73—261 |
| 2,787,963 | 4/1957 | Dolan et al. | 103—126 |
| 2,958,312 | 11/1960 | Shimomura | 123—13 |

FOREIGN PATENTS

| | | |
|---|---|---|
| 2,331 | 9/1864 | Great Britain. |
| 18,551 | 9/1901 | Great Britain. |
| 30,618 | 4/1904 | Switzerland. |

JAMES J. GILL, *Primary Examiner.*

ROBERT S. SALZMAN, *Assistant Examiner.*

U.S. Cl. X.R.

91—68, 95